United States Patent [19]

Rippon

[11] 4,179,220

[45] Dec. 18, 1979

[54] APPARATUS FOR ANAEROBIC DIGESTION OF BIODEGRADABLE WASTE MATERIAL

[75] Inventor: George M. Rippon, Ashford, England

[73] Assignee: Biomechanics Limited, Ashford, England

[21] Appl. No.: 919,809

[22] Filed: Jun. 28, 1978

[30] Foreign Application Priority Data

Jul. 5, 1977 [GB] United Kingdom ............... 28183/77

[51] Int. Cl.² .............................................. B01F 7/16
[52] U.S. Cl. ..................................... 366/102; 366/280
[58] Field of Search ............... 366/102, 168, 169, 280, 366/279, 281, 282, 283, 320

[56] References Cited

U.S. PATENT DOCUMENTS

| 2,458,061 | 1/1949 | Coulter | 366/102 X |
| 4,089,507 | 5/1978 | Arai | 366/102 |
| 4,100,610 | 7/1978 | Johnston | 366/102 |

FOREIGN PATENT DOCUMENTS 683425 11/1952 United Kingdom .................... 366/102

*Primary Examiner*—Edward J. McCarthy
*Attorney, Agent, or Firm*—Bacon & Thomas

[57] ABSTRACT

Apparatus for anaerobic digestion of biodegradable waste material comprises a closed substantially vertical cylindrical tank containing a mixing assembly which comprises an annular gas-holding member connected to a gas distribution arm extending substantially radially outwardly from the annular gas-holding member towards the periphery of the tank. Both the annular gas-holding member and the gas distribution arm have open lower surfaces, and the gas distribution arm has exhaust apertures spaced along the length of the arm for delivering gas from the gas-holding member at different radial distances along the arm. The mixing assembly is rotatable about the central axis of the tank, with which axis the annular gas-holding member is concentrically located, and gas is supplied to the gas-holding member by a gas delivery duct having an outlet disposed beneath a part of the annulus defined by the annular gas-holding member.

8 Claims, 4 Drawing Figures

APPARATUS FOR ANAEROBIC DIGESTION OF BIODEGRADABLE WASTE MATERIAL

BACKGROUND OF THE INVENTION

This invention relates to apparatus for anaerobic digestion of biodegradable waste material.

In the design and operation of anaerobic digestion apparatus, mixing of the contents of the tanks, which are often very large, is necessary to ensure good contact between the bacteria and their food supply which is the effluent, i.e. biodegradable waste material, to be treated.

The concentration of the solids material which should be maintained in suspension in the tank during anaerobic digestion is often such, especially during start-up of the process, that the solids material tends to settle fast to the floor of the tank where it can compact and require a large force to disturb it and move it back into suspension in the tank. Because of this much more energy is required to maintain in suspension a low concentration of solids than is required with a high concentration of solids which behaves more like a homogeneous liquid and can be kept mixed by using relatively inexpensive gas lift pumps which use relatively little power.

In order for gas lift pumps to produce uniform liquid velocitites of the order of 0.5 to 1.5 feet per second over the whole floor of the large tank, very large energy inputs are required to overcome the friction and hydraulic shock losses of moving these very large volumes.

An alternative method of preventing settling and compaction of the solids material as a sludge on the bottom of the tank is to use a rotating scraper arm. Such scraper arms are usually driven by a central torque tube from outside the tank roof by a reduction gear drive system. For large tanks the central drive systems for the scraper arm involve very large torques and are consequently very expensive.

The difficulty of mixing the anaerobic bacteria in the waste material in the digestion tank is one of the important factors currently limiting the diameter of the digestion tanks which, for this reason, are built higher and frequently involve very costly foundations.

SUMMARY OF THE INVENTION

According to the present invention settling and compaction of sludge on the bottom of the anaerobic digestion tank is substantially prevented by rotating an arm from which gas is emitted at a plurality of positions along the length of the arm.

Further in accordance with the present invention there is provided apparatus for anaerobic digestion of biodegradable waste material comprising a closed substantially vertical cylindrical tank having a central axis, a gas delivery duct having an outlet disposed near to the central axis of the tank and to the base of the tank, and a mixing assembly located within the tank for rotation about the central axis of the tank, the mixing assembly comprising a gas-holding member which has an open lower surface and which defines an annulus concentric with the said central axis, a part of the annulus defined by the gas-holding member being positioned above the outlet of the gas delivery duct, and a gas distribution arm extending substantially radially outwardly from the said gas-holding member towards the periphery of the tank and having exhaust apertures spaced along the length of the arm for delivering gas from the gas-holding member at different radial distances along the arm, means supporting the gas-holding member and the gas distribution arm near the base of the tank, and drive means for causing the mixing assembly to be rotated about the said central axis.

The drive means may comprise a rotatable member positioned within the tank and near the periphery thereof at a similar level in the tank to the mixing assembly, a motor located outside the tank and linked to the rotatable member by means enabling the motor to drive the rotatable member, a wheel located concentrically with the axis of the tank and rigidly connected to the gas-holding member and the gas distribution arm, and an endless flexible drive member embracing the circumferences of the rotatable member and the wheel for transmitting rotational movement from the rotatable member to the wheel.

Alternatively, the drive means may comprise gas lift draught tubes mounted on the gas distribution arm for receiving gas from the arm, each gas lift draught tube comprising a vertical portion connected through a right angle bend to a horizontal portion. The driving force is provided by a reaction force developed at the right angle bend. Preferably each gas lift draught tube comprises two horizontal portions connected through right angle bends to opposite ends of the vertical portion.

As a further alternative the drive means may comprise gas lift draught tubes mounted on the gas distribution arm for receiving gas from the arm and including a vertical portion incorporating therein a propeller turbine, and means connecting the output from the said turbine to individual drive wheels which support the gas distribution arm.

Advantageously the drive means comprises a rotatable member positioned within the tank above the level of liquid in the tank, and a motor located outside the tank and linked to the rotatable member by means enabling the motor to drive the rotatable member, and the supporting means comprises a torque transmitting cage suspended from the rotatable member and carrying the mixing assembly.

BRIEF DESCRIPTION OF THE DRAWINGS

Three embodiments of the present invention will be described by way of example, with reference to the accompanying drawings in which.

In the drawings the same or similar parts are designated by like reference numerals.

DETAILED DESCRIPTION

Figure 1:
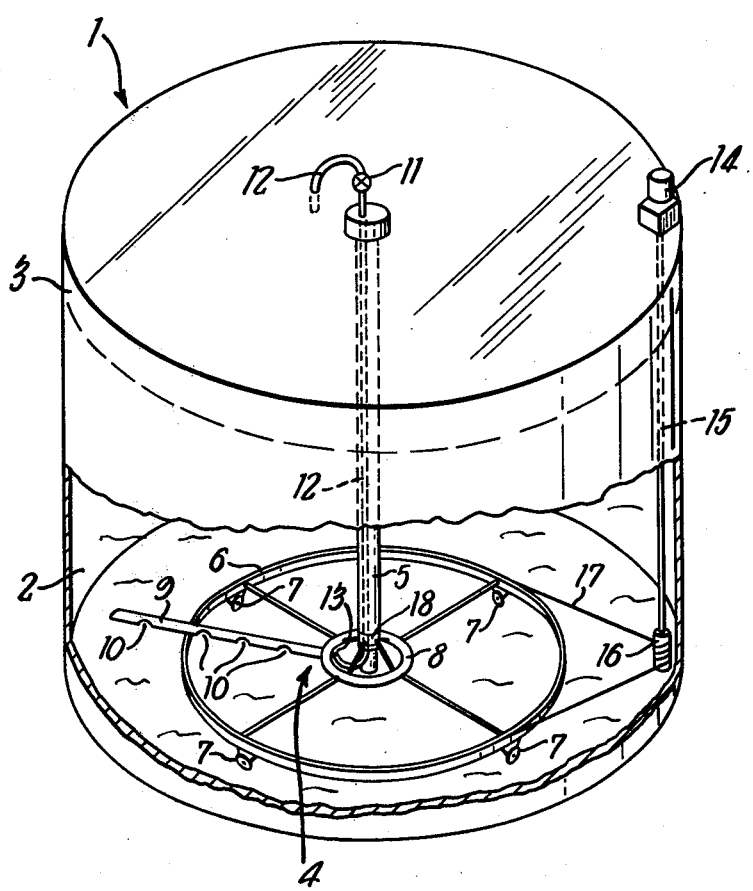
FIG. 1 is a diagrammatic perspective view of apparatus for anaerobic digestion of biodegradable waste material including one embodiment of mixing assembly comprising a gas-holding member and a gas distribution arm.

Referring to FIG. 1 of the accompanying drawings there is shown a closed anaerobic digestion tank indicated generally by the reference numeral 1, the tank comprising a lower digester portion 2 and an upper gas storage portion 3. Near the base of the lower digester portion 2 of the tank 1 there is provided a mixing assembly indicated generally by the reference numeral 4, which is capable of rotation about a central vertical member 5 the axis of which is concentric with the central vertical axis of the tank 1.

The mixing assembly 4 is supported on supporting means constituted by a horizontal wheel 6 which has pivotably mounted beneath its circumference a plurality of vertical wheels 7 which contact the base of the tank 1. The mixing assembly 4 essentially comprises a gas-holding member 8 and a gas distribution arm 9.

Both the gas holding member 8 and the gas distribution arm 9 are constituted by inverted channel members. The gas-holding member 8 is arranged in a circle and thus defines an annulus concentric with the axis of the central vertical member 5 and the central vertical axis of the tank 1. The gas distribution arm 9 which is connected to and extends radially from the outer circumference of the gas-holding member 8 includes a plurality of cut-away portions 10 in the lower periphery of its inverted channel member. The cut-away portions 10 may be U-shaped or V-shaped.

Advantageously, the gas is supplied to the gas-holding member 8 from the upper gas storage portion 3 of the tank 1 by a pump 11 which pumps gas through a gas delivery duct 12 having an outlet 13 placed vertically beneath a part of the annulus defined by the gas-holding member 8. Accordingly, gas pumped from the upper gas storage portion 3 through the gas delivery duct 12 will be delivered to the gas holding member 8. Gas so received by the gas-holding member 8 is also passed along the gas distribution arm 9, and retained in the connected inverted channels of both the gas-holding member 8 and the gas distribution arm 9 until the volume of gas is such that the level of gas held beneath the level of the liquid in the lower digester portion 2 of the tank 1 reaches the upper peripheries of the cut-away portions 10 in the gas distribution arm 9. Gas bubbles are then emitted through the cut-away portions 10 and provide a gas lift mixing effect in the lower digester portion 2 of the tank 1.

In the embodiment of the present invention illustrated in FIG. 1 the mixing assembly 4 is driven by a motor 14 positioned outside the tank 1 and connected through a drive shaft 15 to a vertically rotatable member 16 positioned near the periphery of the lower digester portion 2. An endless steel cable 17 is passed several times (for example five or six times) around the circumference of the rotatable member 16 and also twice around the outer circumference of the horizontal wheel 6, the endless steel cable 17 thereby transmitting the drive from the rotatable member 16 to the mixing assembly 4 through the horizontal wheel 6 which supports the gas-holding member 8 and the gas distribution arm 9.

The mixing assembly 4 is thereby slowly rotated in the lower digester portion 2 so that the gas distribution arm 9 is traversed slowly through the solids assembled near the base of the lower digester portion 2 and the gas emitted from the cut-away portions 10 in the gas distribution arm 9 causes vertical movements disturbing the solids near the base of the lower digester portion 2.

Because the gas-holding member 8 is formed as an annulus, gas delivered from the outlet of the gas delivery duct 12 continually replenishes the gas stored in the gas-holding member 8 and the gas distribution arm 9 so that there is an endless emission of gas lift bubbles from the cutaway portions 10 throughout the rotation of the mixing assembly 4.

Figure 2:
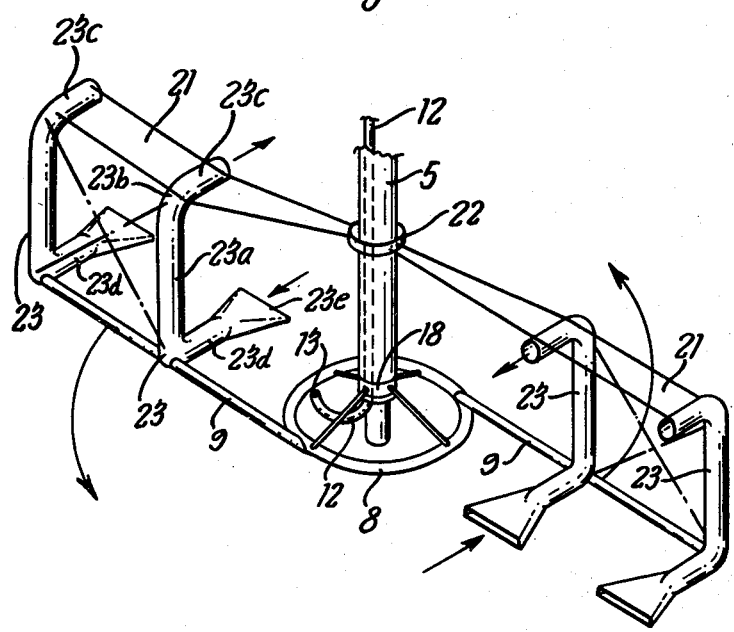
FIG. 2 is a perspective view of an alternative embodiment of mixing assembly including a gas-holding member and a gas distribution arm.

An alternative embodiment of the mixing assembly including the gas-holding member 8 and the gas distribution arm 9 is shown in FIG. 2 of the accompanying drawings. This includes a horizontally extending arm 21 which is vertically above and substantially parallel to the gas distribution arm 9. The arm 21 is mounted to the central vertical member 5 by bearings 22 similar to the bearings 18 supporting the gas-holding member 8. The gas distribution arm 9 and the arm 21 together support gas lift draught tubes 23 which include a vertical portion 23a which is connected through a right angle bend 23b to a horizontal portion 23c. In the arrangements shown in FIG. 2 the gas lift draught tubes 23 also include a lower horizontal portion 23d which terminates in a broader member 23e which has an aperture (not shown) in its lower surface.

In operation the gas distribution member 9 of FIG. 2 delivers gas into the gas lift tubes 23 which, being immersed in the lower digester portion of the tank, contain liquids and solids material being subjected to anaerobic digestion. The emission of the gas bubbles at the foot of the vertical portions 23a of the gas lift tubes 23 causes liquid within these vertical portions to be raised vertically with a simultaneous drawing in of further liquid or sludge through the apertures in the lower surfaces of the broader members 23e and discharge of liquid from the upper horizontal portion 23c.

There is thus a continuous movement of liquid through the gas lift draught tubes 23 from the horizontal portion 23d into the vertical portion 23a and thence into the horizontal portion 23c from which the liquid is expelled. The changes of direction in the movement of the liquid at the right angle bends at the opposite ends of the vertical portions 23a produce the reaction forces which cause the mixing assembly of FIG. 2 to turn on the bearings 18 and 22 about the central member 5 and so move through the liquid and solids near the base of the lower digester portion to effect mixing.

A gas lift draught tube 23 positioned on the mixing assembly at the end of the gas distribution arm 9 remote from the central member 5 is advantageously of a greater cross-sectional area than the gas lift draught tube positioned nearer to the central member 5. Any desired number of gas lift draught tubes 23 can be provided in association with the gas distribution arm 9.

The mixing assembly of FIG. 2 may also be modified by the provision of one or more cut-away portions 10 in the gas distribution arm 9, which cut-away portions are not associated with gas lift draught tubes 23.

The mixing assembly of FIG. 2 can be mounted on vertical wheels so that the weight of the assembly including the gas distribution arm 9, the horizontal arm 21 and the gas lift draught tubes 23 is supported by the wheels rather than by the central member 5. Alternatively, the mixing assembly of FIG. 2 can be supported on bearings located above the level of liquid under treatment, for example the bearings may be outside and above the tank.

As shown in FIG. 2 the mixing assembly may extend over a diameter of the tank 1 by the provision of two radial gas distribution arms 9, rather than just along a radius as shown in the mixing assembly of FIG. 1 which has a single gas distribution arm 9. However, the mixing assembly of FIG. 1 may be modified to include a second gas distribution arm 9, if desired, and similarly the mixing assembly of FIG. 2 could be constructed with only a single gas distribution arm 9.

The gas lift draught tubes 23 could be constructed with only one of the horizontal portions, that is to say either the horizontal portion 23c or the horizontal portion 23d, the reaction force at the single right angle bend in a plurality of gas lift draught tubes mounted on the gas distribution arm 9 being sufficient to move the mixing assembly.

Figure 4:
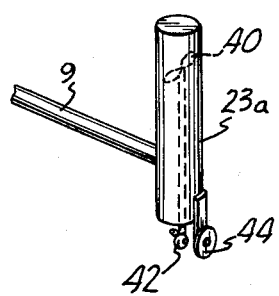
FIG. 4 is a schematic view of a further embodiment.

As a further alternative shown schematically in FIG. 4, the gas lift draught tubes 23 of FIG. 2 could be provided without any horizontal portions 23c and 23d but with propeller turbines 40 located in the vertical portions 23a with drive means 42 connecting the output from the turbines to vertical wheels 44 supporting the mixing assembly immediately beneath respective gas lift draught tubes 23.

Figure 3:
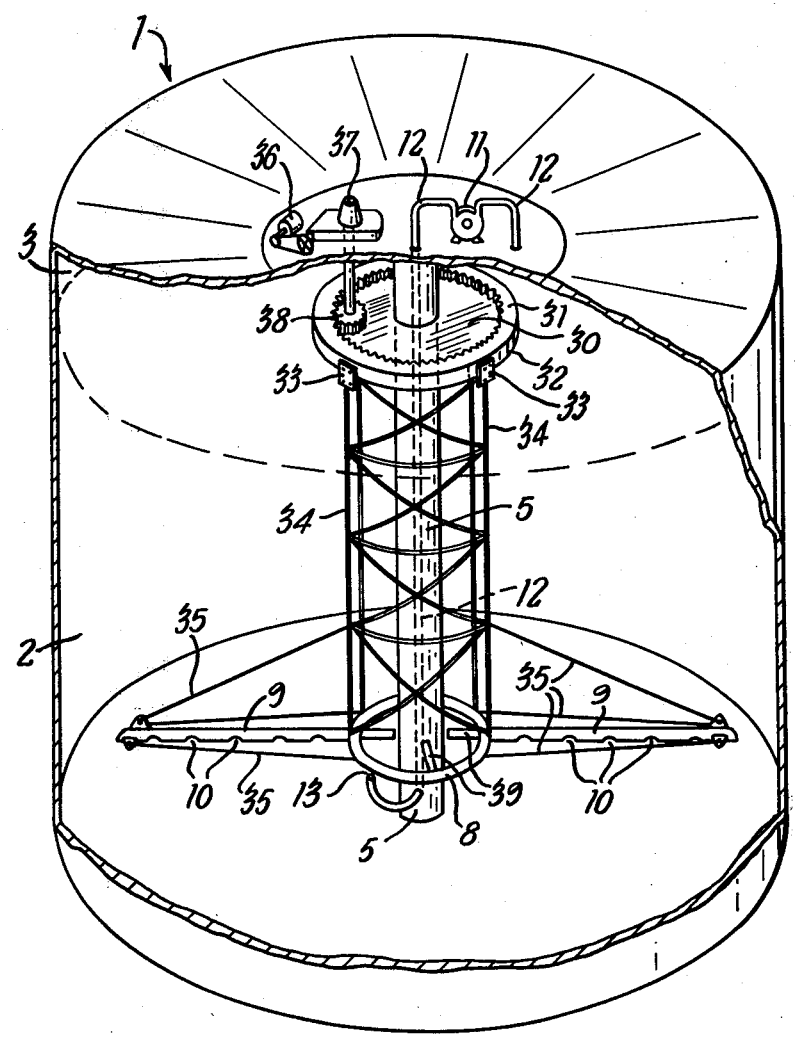
FIG. 3 is a view similar to FIG. 1 of another apparatus in accordance with the present invention.

Referring now to FIG. 3, there is shown another embodiment of apparatus according to the present invention, and incorporating a mixing assembly comprising a gas-holding member 8 and a pair of gas distribution arms 9 similar to the gas distribution arm 9 of FIG. 1.

However, in the apparatus of FIG. 3, the central vertical member 5, which is a supporting column of concrete or steel, carries a disc 30 at a level which is below the roof of the tank 1 but above the level of liquid in the tank 1. The disc 30, which is made of the same material as the vertical member 5 is thus located in the upper gas storage portion 3 of the tank 1. The disc 30 constitutes a platform within the tank 1 on which an internally toothed ring gear wheel 31 is mounted on bearings. From the outer periphery 32 of the gear wheel 31 there is suspended, by means of bolts or other suitable fixing means 33, a torque transmission cage 34.

The torque transmission cage 34 carries the gas-holding member 8 and the gas distribution arms 9 which are connected to the cage 34 by supporting wires 35. The gas distribution arms 9 are therefore connected directly to the gas-holding member 8 for supply of gas, and also to the cage 34 by the supporting wires 35.

The internally toothed ring gear wheel 31 is driven by a gear 38 from a standard reduction gear motor 36 through any suitable gear means 37. The drive for the gear wheel 31 may, conveniently, include a worm and wheel reducer gear.

The gas supply to the gas-holding member 8 of FIG. 3 is essentially similar to that described with reference to FIG. 1. However, the gas-holding member 8 is provided with four steady bearings 39 of lignum-vitae, or similar material, for maintaining the suspended mixing assembly in position during rotation.

The embodiment of FIG. 3 has the advantage over that of FIG. 1 of accessibility of the supporting means for maintenance and repair. Alternatively to the construction illustrated the supporting means could be external to the tank 1, for example on the roof of the tank 1.

The arrangements described in accordance with the present invention are much less costly to install than conventional mixing means, and the embodiments of FIGS. 1 and 3 have an additional advantage that much less power is required to provide both scraping of the bottom of the lower digester portion 2 of the tank 1 and mixing of the materials therein than in the conventional scraper and mixing assemblies.

With a conventional scraper arm rotating about a central axis the torque required to rotate the scraper is large because it is moving through a thick sludge and propelling the thick sludge towards the centre of the tank. With the gas-emitting scraper arm of the present invention, the gas emitted from the arm 9 clears the sludge away from the immediate vicinity of the scraper arm 9 with the result that, when the scraper arm 9 is moving slowly (for example one revolution per hour), only a relatively small torque is required to move the scraper arm through the liquid near the base of the tank. It is because of this clearance of the thick sludge from the region of the scraper arm that it is possible to drive the scraper arm with standard driving mechanisms which are lighter and therefore less expensive than those used to drive prior art rotating scraper arms. This applies not only to the drive mechanism which is located outside the tank, but also applies to the torque transmission cage 34 or other torque tube which transmits the torque to the gas-emitting scraper arm at the base of the tank.

I claim:

1. Apparatus for anaerobic digestion of biodegradable waste material comprising a closed substantially vertical cylindrical tank having a central axis, a gas delivery duct having an outlet disposed near to the central axis of the tank and to the base of the tank, a mixing assembly located within the tank for rotation about the central axis of the tank, the mixing assembly comprising an annular gas-holding member which has an open lower surface and which defines an annulus concentric with the said central axis, a part of the annulus defined by the gas-holding member being positioned above the outlet of the gas delivery duct, and a gas distribution arm extending substantially radially outwardly from the said gas-holding member towards the periphery of the tank and having exhaust apertures spaced along the length of the arm for delivering gas from the gas-holding member at different radial distances along the arm, supporting means for supporting the gas-holding member and the gas distribution arm near the base of the tank, and drive means for causing the mixing assembly to be rotated about the said central axis.

2. Apparatus according to claim 1 wherein the weight of the mixing assembly is supported on bearings above the level of liquid under treatment in the tank.

3. Apparatus according to claim 1 wherein the drive means comprises gas lift draught tubes mounted on the gas distribution arm for receiving gas from the arm, each gas lift draught tube comprising a vertical portion connected through a right angle bend to a horizontal portion.

4. Apparatus according to claim 3 wherein each gas lift draught tube comprises two horizontal portions connected through right angle bends to opposite ends of the vertical portion.

5. Apparatus according to claim 1 wherein the drive means comprises gas lift draught tubes mounted on the gas distribution arm for receiving gas from the arm and including a vertical portion incorporating therein a propeller turbine, and means connecting the output from the said turbine to individual drive wheels which support the gas distribution arm.

6. Apparatus according to claim 1 wherein the mixing assembly is supported by bearings on a platform located within the tank above the level of liquid in the tank.

7. Apparatus according to claim 1 wherein the drive means comprises a rotatable member positioned within the tank above the level of liquid in the tank, and a motor located outside the tank and linked to the rotatable member by means enabling the motor to drive the rotatable member, and the supporting means comprises a torque transmitting cage suspended from the rotatable member and carrying the mixing assembly.

8. Apparatus for anaerobic digestion of biodegradable waste material comprising a closed substantially vertical cylindrical tank having a central axis, a gas delivery duct having an outlet disposed near to the central axis of the tank and to the base of the tank, a mixing assembly located within the tank and near the base of the tank for rotation about the central axis of the tank, the mixing assembly comprising a gas-holding member having an open lower surface and being positioned relative to the outlet of the gas delivery duct for receiving gas from the gas delivery duct during rotation of the mixing assembly and a gas distribution arm extending substantially radially outwardly from the said gas-holding member towards the periphery of the tank and having exhaust apetures spaced along the length of the arm for delivering gas from the gas-holding member at different radial distances along the arm, and drive means for causing the mixing assembly to be rotated about the said central axis.

* * * * *